United States Patent
Cui et al.

(10) Patent No.: US 10,425,911 B2
(45) Date of Patent: Sep. 24, 2019

(54) POSITIONING APPARATUS AND METHOD

(71) Applicant: Huawei Technologies Co., Ltd., Shenzhen, Guangdong (CN)

(72) Inventors: Jie Cui, Shenzhen (CN); Anjian Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/056,225

(22) Filed: Aug. 6, 2018

(65) Prior Publication Data

US 2018/0368096 A1 Dec. 20, 2018

Related U.S. Application Data

(63) Continuation of application No. 15/267,416, filed on Sep. 16, 2016, now Pat. No. 10,064,155, which is a
(Continued)

(51) Int. Cl.
*H04W 64/00* (2009.01)
*G01S 5/00* (2006.01)
(Continued)

(52) U.S. Cl.
CPC ........... *H04W 64/00* (2013.01); *G01S 5/0027* (2013.01); *G01S 5/0063* (2013.01); *G01S 5/0236* (2013.01); *G01S 5/10* (2013.01)

(58) Field of Classification Search
CPC ...... H04W 64/00; H04W 24/08; H04W 24/00
See application file for complete search history.

(56) References Cited

U.S. PATENT DOCUMENTS

2007/0135134 A1 6/2007 Patrick
2009/0303129 A1* 12/2009 Sairo ............... G01S 5/0045
342/386
(Continued)

FOREIGN PATENT DOCUMENTS

CN       1902957 A       1/2007
CN      101931994 A     12/2010
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 v12.1.0, Mar. 2014, 120 pages.
(Continued)

*Primary Examiner* — Myron Wyche
(74) *Attorney, Agent, or Firm* — Fish & Richardson P.C.

(57) ABSTRACT

The present invention discloses a positioning apparatus and method. In embodiments of the present invention, a sending module sends auxiliary data information to a terminal, where the auxiliary data information is information required by the terminal to perform measurement on positioning nodes, where the auxiliary data information includes positioning node index numbers of the positioning nodes; a receiving module receives a positioning measurement result sent by the terminal, and provides the positioning measurement result to a positioning module, where the positioning measurement result includes a positioning measurement result corresponding to each positioning node index number, or a positioning measurement result that a reference positioning node index number separately corresponds to other positioning node index numbers; and the positioning module determines a location of the terminal by using the positioning measurement result.

16 Claims, 8 Drawing Sheets

Related U.S. Application Data continuation of application No. PCT/CN2014/073670, filed on Mar. 19, 2014.

(51) Int. Cl.
  *G01S 5/02* (2010.01)
  *G01S 5/10* (2006.01)

(56) References Cited

U.S. PATENT DOCUMENTS

| | | | |
|---|---|---|---|
| 2010/0001905 | A1 | 1/2010 | Ward et al. |
| 2010/0323718 | A1 | 12/2010 | Jen |
| 2012/0040696 | A1* | 2/2012 | Siomina ............... G01S 5/0036 455/456.6 |
| 2012/0147796 | A1 | 6/2012 | Ishii et al. |
| 2013/0051317 | A1 | 2/2013 | Ji et al. |
| 2014/0112180 | A1* | 4/2014 | Axmon ................ H04W 24/10 370/252 |
| 2014/0235273 | A1 | 8/2014 | Ahn et al. |
| 2014/0295883 | A1 | 10/2014 | Kang |

FOREIGN PATENT DOCUMENTS

| | | |
|---|---|---|
| CN | 102186191 A | 9/2011 |
| CN | 102869038 A | 1/2013 |
| CN | 103209475 A | 7/2013 |
| JP | 2007512784 A | 5/2007 |
| JP | 2011049906 A | 3/2011 |
| KR | 100946773 B1 | 3/2010 |
| KR | 20130035965 A | 4/2013 |
| WO | 2013/036060 A1 | 3/2013 |
| WO | 2013/048210 A1 | 4/2013 |
| WO | 2013/191602 A1 | 12/2013 |

OTHER PUBLICATIONS

"3rd Generation Partnership Project; Technical Specification Group Radio Access Network; Evolved Universal Terrestrial Radio Access (E-UTRA); LTE Positioning Protocol (LLP) (Release 12)", 3GPP TS 36.355 v12.1.0, Mar. 2014, 126 pages.

Huawei, HiSilicon, "New SI proposal: Positioning enhancements for E-UTRA," RP-130680, 3GPP TSG-RAN meeting #60, Oranjestad, Aruba, Jun. 11-14, 2013, 5 pages.

NextNav, Huawei, Broadcom, "New Work Item proposal: Further Indoor Positioning enhancements for UTRA and LTE," RP-160538, 3GPP TSG RAN Meeting #71, Göteborg, Sweden, Mar. 7-10, 2016, 9 pages.

Ran1, "LS on OTDOA for the same PCI," Release 14, R1-165853, 3GPP TSG RAN WG1 #85, Nanjing, China, May 23-27, 2016, 1 page.

Huawei, HiSilicon et al., "WF on PRS sequence generation per TP," R1-168266, 3GPP TSG RAN WG1 #85, Gothenburg, Sweden, Aug. 22-26, 2016, 3 pages.

Huawei, HiSilicon et al., "WF on TDD latency reduction," R1-165892, 3GPP TSG RAN WG1 #85, Nanjing, China, May 23-28, 2016, 3 pages.

NextNav, Huawei, Broadcom, "Revision of WI: Further Indoor Positioning enhancements for UTRA and LTE," RP-161850, 3GPP TSG RAN Meeting #73, New Orleans, Sep. 19-22, 2016, 8 pages.

Huawei, HiSilicon, "Initial discussion on possible positioning enhancement solutions in het-net scenarios," R4-141700, 3GPP TSG-RAN WG4 Meeting #70bis, San Jose Del Cabo, Mexico, Mar. 31-Apr. 4, 2014, 2 pages.

Ran1, "LS on PRS sequence generation per TP," Rel-14, R1-168557, 3GPP TSG RAN WG1 Meeting #86, Gothenburg, Sweden Aug. 22-26, 2016, 1 page.

\* cited by examiner

POSITIONING APPARATUS AND METHOD

CROSS-REFERENCE TO RELATED APPLICATIONS

This application is a continuation of U.S. patent application Ser. No. 15/267,416 filed on Sep. 16, 2016, which is a continuation of International Application No. PCT/CN2014/073670 filed on Mar. 19, 2014. All of the afore-mentioned patent applications are hereby incorporated by reference in their entireties.

TECHNICAL FIELD

The present invention relates to the field of communications technologies, and in particular, to a positioning apparatus and method.

BACKGROUND

A positioning technology is used to determine a geographical location of a terminal. Generally, the geographical location of the terminal may be determined by using a resource of a wireless universal network, for example, in a manner of positioning by observed time difference of arrival (Observed Time Difference of Arrival, OTDOA).

In an evolved universal terrestrial radio access network (Evolved Universal Terrestrial Radio Access Network, E-UTRAN) system, when one base station serves a terminal, a characteristic parameter (for example, signal field strength, propagation signal time difference of arrival, or signal arrival azimuth) of a radio wave propagation signal between the terminal and the base station is detected, to obtain a distance between the terminal and the base station, and then a circle is obtained by using the distance between the terminal and the base station as a radius, where it is considered that the terminal falls within a range of the circle. When multiple different base stations (for example, three different base stations: a base station 0, a base station 1, and a base station 2) serve a same terminal, distances from the base stations to the terminal are obtained first, where the distance from the terminal to the base station 0 is $d_0$, the distance from the terminal to the base station 1 is $d_1$, and the distance from the terminal to the base station 2 is $d_2$; and then a hyperbola is formed by using a difference $d_1-d_0$ between the distance from the terminal to the base station 0 and the distance from the terminal to the base station 1, and another hyperbola is formed by using a difference $d_2-d_1$ between the distance from the terminal to the base station 1 and the distance from the terminal to the base station 2, where an intersecting point of the two hyperbolas is a location of the terminal. The terminal determines different radio wave propagation signals by using cell identifications (Cell Identification, CID) carried in the radio wave propagation signals.

However, with ongoing development of mobile communications technologies, signal coverage strength keeps increasing. In some hotspot areas or "black hole" areas, nodes for enhancing a coverage signal or increasing a capacity may be deployed, where these nodes have a same CID when these nodes belong to a same cell. Therefore, in the prior art, when positioning nodes (nodes that belong to a same cell) send radio wave propagation signals to a terminal, the terminal cannot identify the positioning nodes by using the received radio wave propagation signals. Therefore, positioning measurement performed by the terminal cannot be associated with a corresponding positioning node, and consequently the terminal cannot be precisely located.

SUMMARY

Embodiments of the present invention provide a positioning apparatus and method, which are used to resolve a problem of locating a terminal when multiple nodes that belong to a same cell serve the same terminal.

According to a first aspect, an embodiment of the present invention provides a positioning apparatus, including:

a sending module, configured to send auxiliary data information to a terminal, where the auxiliary data information is information required by the terminal to perform measurement on each positioning node, where the auxiliary data information includes a positioning node index number of each positioning node;

a receiving module, configured to: receive a positioning measurement result sent by the terminal, and provide the positioning measurement result to a positioning module, where the positioning measurement result includes a positioning measurement result corresponding to each positioning node index number, or a positioning measurement result corresponding to another positioning node index number relative to a reference positioning node index number; and the positioning module, configured to determine a location of the terminal by using the positioning measurement result.

In a first possible embodiment, with reference to the first aspect, the positioning node index number is located in a predetermined field in the auxiliary data information, where the predetermined field is any one of the following: a cell global identity CGI field, an enhanced cell global identity eCGI field, and an index number field.

In a second possible embodiment, with reference to the first aspect or the first possible embodiment of the first aspect, the auxiliary data information further includes reference signal information of each positioning node, and a correspondence between the positioning node index number and the reference signal information, where the reference signal information of each positioning node includes at least: reference signal sending bandwidth, a reference signal sending time, a reference signal subframe quantity, reference signal frequency information, and reference signal muting information.

In a third possible embodiment, with reference to the second possible embodiment of the first aspect, the apparatus further includes:

a configuration module, configured to: configure the reference signal information of each positioning node for each positioning node, where the reference signal information of each positioning node is used to instruct each positioning node to send reference signals, set the positioning node index number for each positioning node, provide the reference signal information of each positioning node and each positioning node index number to an association module, and provide each positioning node index number to a determining module;

the determining module, configured to determine a geographical location corresponding to each positioning node index number; and the association module, configured to associate each positioning node index number with reference signal information of a positioning node corresponding to each positioning node index number, to obtain a correspondence between the positioning node index number and the reference signal information.

In a fourth possible embodiment, with reference to the first aspect or any one of the foregoing possible embodiments of the first aspect, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value; and the positioning module is specifically configured to: when the positioning measurement result is the reference signal received strength corresponding to each positioning node index number, select a location of a positioning node whose reference signal received strength is the maximum as the location of the terminal; or when the positioning measurement result is the RSTD measurement value corresponding to the other positioning node index number relative to the reference positioning node index number, select a location of a positioning node closest to the terminal as the location of the terminal, or determine, by a network-side device, the location of the terminal by using a predetermined algorithm.

According to a second aspect, an embodiment of the present invention provides another positioning apparatus, including:

a receiving module, configured to receive auxiliary data information sent by a network-side device, and provide the auxiliary data information to a measurement module, where the auxiliary data information is information required by the terminal to perform measurement on each positioning node, where the auxiliary data information includes a positioning node index number of each positioning node;

the measurement module, configured to: perform, by using the auxiliary data information, measurement on a reference signal sent by each positioning node, to obtain a positioning measurement result, and provide the positioning measurement result to a sending module, where the positioning measurement result includes a positioning measurement result corresponding to each positioning node index number, or a positioning measurement result corresponding to another positioning node index number relative to a reference positioning node index number; and the sending module, configured to send the positioning measurement result to the network-side device.

In a first possible embodiment, with reference to the second aspect, the positioning node index number is located in a predetermined field in the auxiliary data information, where the predetermined field is any one of the following: a cell global identity CGI field, an enhanced cell global identity eCGI field, and an index number field.

In a second possible embodiment, with reference to the second aspect or the first possible embodiment of the second aspect, the auxiliary data information further includes reference signal information of each positioning node, and a correspondence between the positioning node index number and the reference signal information, where the reference signal information of each positioning node includes at least: reference signal sending bandwidth, a reference signal sending time, a reference signal subframe quantity, reference signal frequency information, and reference signal muting information.

In a third possible embodiment, with reference to the second possible embodiment of the second aspect, the apparatus further includes: a determining module, where the receiving module is further configured to: receive, by using the auxiliary data information, the reference signal sent by each positioning node, and provide, to the determining module, the reference signal sent by each positioning node; and the determining module is configured to determine, by using the correspondence between the positioning node index number and the reference signal information, a positioning node index number corresponding to each reference signal.

In a fourth possible embodiment, with reference to the second aspect or any one of the foregoing possible embodiments of the second aspect, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value.

According to a third aspect, an embodiment of the present invention provides another positioning apparatus, including:

a memory, configured to store information that includes a program instruction;

a transceiver, configured to: send auxiliary data information to a terminal, where the auxiliary data information is information required by the terminal to perform measurement on each positioning node, where the auxiliary data information includes a positioning node index number of each positioning node; and receive a positioning measurement result sent by the terminal, and provide the positioning measurement result to a processor, where the positioning measurement result includes a positioning measurement result corresponding to each positioning node index number, or a positioning measurement result corresponding to another positioning node index number relative to a reference positioning node index number; and the processor, coupled to the memory and the transceiver, configured to control execution of the program instruction, and specifically configured to determine a location of the terminal by using the positioning measurement result.

In a first possible embodiment, with reference to the third aspect, the positioning node index number is located in a predetermined field in the auxiliary data information, where the predetermined field is any one of the following: a cell global identity CGI field, an enhanced cell global identity eCGI field, and an index number field.

In a second possible embodiment, with reference to the third aspect or the first possible embodiment of the third aspect, the auxiliary data information further includes reference signal information of each positioning node, and a correspondence between the positioning node index number and the reference signal information, where the reference signal information of each positioning node includes at least: reference signal sending bandwidth, a reference signal sending time, a reference signal subframe quantity, reference signal frequency information, and reference signal muting information.

In a third possible embodiment, with reference to the second possible embodiment of the third aspect, the processor is further configured to: configure the reference signal information of each positioning node for each positioning node, where the reference signal information of each positioning node is used to instruct each positioning node to send a reference signal, and set the positioning node index number for each positioning node; determine a geographical location corresponding to each positioning node index number; and associate each positioning node index number with reference signal information of a positioning node corresponding to each positioning node index number, to obtain a correspondence between the positioning node index number and the reference signal information.

In a fourth possible embodiment, with reference to the third aspect or any one of the foregoing possible embodiments of the third aspect, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value; and the processor is specifically configured to: when the positioning measurement result is the reference signal received strength corresponding to each positioning node index number, select a location of a positioning node whose reference signal received strength is the maximum as the location of the terminal; or when the positioning measurement result is the RSTD measurement value corresponding to the other positioning node index number relative to the reference positioning node index number, select a location of a positioning node closest to the terminal as the location of the terminal, or determine, by the network-side device, the location of the terminal by using a predetermined algorithm.

According to a fourth aspect, an embodiment of the present invention provides another positioning apparatus, including:

a memory, configured to store information that includes a program instruction;

a transceiver, configured to: receive auxiliary data information sent by a network-side device, and provide the auxiliary data information to a processor, where the auxiliary data information is information required by the terminal to perform measurement on each positioning node, where the auxiliary data information includes a positioning node index numbers of each positioning node; and the processor, coupled to the memory and the transceiver, configured to control execution of the program instruction, and specifically configured to: perform, by using the auxiliary data information, measurement on reference signals sent by the positioning nodes, to obtain a positioning measurement result, and provide the positioning measurement result to the transceiver, where the positioning measurement result includes a positioning measurement result corresponding to each positioning node index number, or a positioning measurement result corresponding to another positioning node index number relative to a reference positioning node index number, where the transceiver is further configured to send the positioning measurement result to the network-side device.

In a first possible embodiment, with reference to the fourth aspect, the positioning node index number is located in a predetermined field in the auxiliary data information, where the predetermined field is any one of the following: a cell global identity CGI field, an enhanced cell global identity eCGI field, and an index number field.

In a second possible embodiment, with reference to the fourth aspect or the first possible embodiment of the fourth aspect, the auxiliary data information further includes reference signal information of each positioning node, and a correspondence between the positioning node index number and the reference signal information, where the reference signal information of each positioning node includes at least: reference signal sending bandwidth, a reference signal sending time, a reference signal subframe quantity, reference signal frequency information, and reference signal muting information.

In a third possible embodiment, with reference to the second possible embodiment of the fourth aspect, the transceiver is further configured to: receive, by using the auxiliary data information, the reference signal sent by each positioning node, and provide, to the processor, the reference signal sent by each positioning node; and the processor is configured to determine, by using the correspondence between the positioning node index number and the reference signal information, a positioning node index number corresponding to each reference signal.

In a fourth possible embodiment, with reference to the fourth aspect or any one of the foregoing possible embodiments of the fourth aspect, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value.

According to a fifth aspect, an embodiment of the present invention provides a positioning method, including:

sending, by a network-side device, auxiliary data information to a terminal, where the auxiliary data information is information required by the terminal to perform measurement on each positioning node, where the auxiliary data information includes a positioning node index number of each positioning node;

receiving, by the network-side device, a positioning measurement result sent by the terminal, where the positioning measurement result includes a positioning measurement result corresponding to each positioning node index number, or a positioning measurement result corresponding to another positioning node index number relative to a reference positioning node index number; and determining, by the network-side device, a location of the terminal by using the positioning measurement result.

In a first possible embodiment, with reference to the fifth aspect, the positioning node index number is located in a predetermined field in the auxiliary data information, where the predetermined field is any one of the following: a cell global identity CGI field, an enhanced cell global identity eCGI field, and an index number field.

In a second possible embodiment, with reference to the fifth aspect or the first possible embodiment of the fifth aspect, the auxiliary data information further includes reference signal information of each positioning node, and a correspondence between the positioning node index number and the reference signal information, where the reference signal information of each positioning node includes at least: reference signal sending bandwidth, a reference signal sending time, a reference signal subframe quantity, reference signal frequency information, and reference signal muting information.

In a third possible embodiment, with reference to the second possible embodiment of the fifth aspect, before the sending, by a network-side device, auxiliary data information to a terminal, the method further includes:

configuring, by the network-side device, the reference signal information of each positioning node for each positioning node, where the reference signal information of each positioning node is used to instruct each positioning node to send a reference signal;

setting, by the network-side device, the positioning node index number for each positioning node, and determining a geographical location corresponding to each positioning node index number; and associating, by the network-side device, each positioning node index number with reference signal information of a positioning node corresponding to each positioning node index number, to obtain a correspondence between the positioning node index number and the reference signal information.

In a fourth possible embodiment, with reference to the fifth aspect or any one of the foregoing possible embodiments of the fifth aspect, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value; and the determining, by the network-side device, a location of the terminal by using positioning measurement results includes:

when the positioning measurement result is the reference signal received strength corresponding to each positioning node index number, selecting, by the network-side device, a location of a positioning node whose reference signal received strength is the maximum as the location of the terminal; or when the positioning measurement result is the RSTD measurement value corresponding to the other positioning node index number relative to the reference positioning node index number, selecting, by the network-side device, a location of a positioning node closest to the terminal as the location of the terminal, or determining, by the network-side device, the location of the terminal by using a predetermined algorithm.

According to a sixth aspect, an embodiment of the present invention provides another positioning method, including:

receiving, by a terminal, auxiliary data information sent by a network-side device, where the auxiliary data information is information required by the terminal to perform measurement on each positioning node, where the auxiliary data information includes a positioning node index number of each positioning node;

performing, by the terminal by using the auxiliary data information, measurement on reference signals sent by the positioning nodes, to obtain a positioning measurement result, where the positioning measurement result includes a positioning measurement result corresponding to each positioning node index number, or a positioning measurement result corresponding to another positioning node index number relative to a reference positioning node index number; and sending, by the terminal, the positioning measurement result to the network-side device.

In a first possible embodiment, with reference to the sixth aspect, the positioning node index number is located in a predetermined field in the auxiliary data information, where the predetermined field is any one of the following: a cell global identity CGI field, an enhanced cell global identity eCGI field, and an index number field.

In a second possible embodiment, with reference to the sixth aspect or the first possible embodiment of the sixth aspect, the auxiliary data information further includes reference signal information of each positioning node, and a correspondence between the positioning node index number and the reference signal information, where the reference signal information of each positioning node includes at least: reference signal sending bandwidth, a reference signal sending time, a reference signal subframe quantity, reference signal frequency information, and reference signal muting information.

In a third possible embodiment, with reference to the second possible embodiment of the sixth aspect, before the performing, by the terminal by using the auxiliary data information, measurement on the reference signal sent by each positioning node, to obtain a positioning measurement result, the method further includes:

receiving, by the terminal by using the auxiliary data information, the reference signal sent by each positioning node; and determining, by the terminal by using the correspondence between the positioning node index number and the reference signal information, a positioning node index number corresponding to each reference signal.

In a fourth possible embodiment, with reference to the sixth aspect or any one of the foregoing possible embodiments of the sixth aspect, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value.

By means of the positioning apparatus and method that are provided in the embodiments of the present invention, a sending module sends auxiliary data information to a terminal, where the auxiliary data information is information required by the terminal to perform measurement on each positioning node, where the auxiliary data information includes positioning reference signal information of each positioning node, where the positioning reference signal information of each positioning node includes at least a positioning node index number of each positioning node; a receiving module receives a positioning measurement result sent by the terminal, and provide the positioning measurement result to a positioning module, where the positioning measurement result includes a positioning measurement result corresponding to each positioning node index number, or a positioning measurement result corresponding to another positioning node index number relative to a reference positioning node index number; and the positioning module determines a location of the terminal by using each positioning measurement result. Compared with that in the prior art, when positioning nodes (nodes that belong to a same cell) send radio wave propagation signals to a terminal, the terminal cannot identify the positioning nodes by using the received radio wave propagation signals, and therefore, positioning measurement performed by the terminal cannot be associated with a corresponding positioning node, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
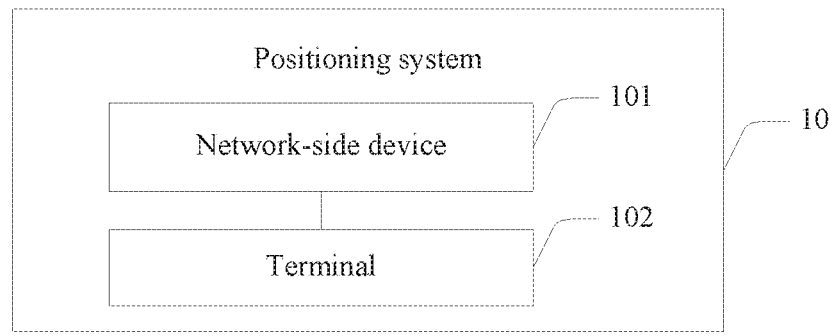
FIG. 1 is a schematic structural diagram of a positioning system according to an embodiment of the present invention.

The present invention provides a positioning system 10. As shown in FIG. 1, the system 10 includes a network-side device 101 and a terminal 102.

The network-side device 101 may a positioning server or a base station.

The system 10 is applicable to a System Architecture Evolution (System Architecture Evolution, SAE)/Long Term Evolution (Long Term Evolution, LTE) cellular network, or another cellular network such as a 2G/3G, WiMAX or Code Division Multiple Access (Code Division Multiple Access, CDMA) cellular network. The corresponding network-side device 101 corresponds to different actual devices in different cellular networks. For example, in the 2G/3G cellular network, the actual device may be a base station, and in the LTE cellular network, the actual device may be an evolved base station (evolved Node B, eNB).

The network-side device 101 is configured to: send auxiliary data information to a terminal 102, where the auxiliary data information is information required by the terminal 102 to perform measurement on each positioning node, where the auxiliary data information includes a positioning node index number of each positioning node; receive a positioning measurement result sent by the terminal 102, where the positioning measurement result includes a positioning measurement result corresponding to each positioning node index number, or a positioning measurement result corresponding to another positioning node index number relative to a reference positioning node index number; and determine a location of the terminal 102 by using the positioning measurement result.

The terminal 102 is configured to: receive the auxiliary data information sent by the network-side device 101; perform, by using the auxiliary data information, measurement on a reference signal sent by each positioning node, to obtain a positioning measurement result; and send the positioning measurement result to the network-side device 101.

A reference positioning node corresponding to the reference positioning node index number is set by the network-side device 101 in advance, and an index number corresponding to the reference positioning node is provided to the terminal 102, so that the terminal 102 performs positioning measurement.

Figure 2:
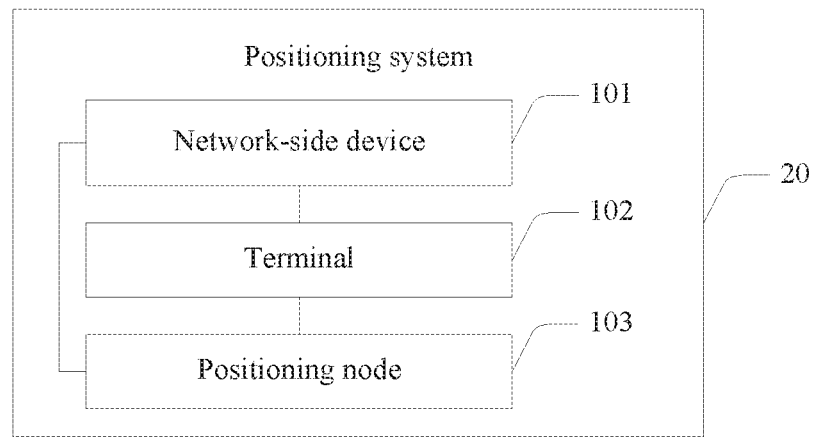
FIG. 2 is a schematic structural diagram of another positioning system according to an embodiment of the present invention.

Further, the present invention further provides another positioning system 20. As shown in FIG. 2, the system 20 further includes: a positioning node 103.

The positioning node 103 is configured to receive reference signal information sent by the network-side device 101, where reference signal information of each positioning node is used to instruct each positioning node to send the reference signal.

It should be noted that, the positioning node 103 is all positioning nodes corresponding to reference signals that can be received by the terminal 102. The positioning node 103 includes a reference positioning node and a neighboring positioning node.

The reference positioning node is used as a reference point for the terminal 102 to measure a reference signal time difference (Reference Signal Time Difference, RSTD). For example, the terminal 102 can receive reference signals sent by four positioning nodes (a positioning node a, a positioning node b, a positioning node c, and a positioning node d), and the network-side device 101 sets the positioning node a as a reference positioning node. When the terminal 102 obtains a positioning measurement result about RSTDs by using auxiliary data information, the positioning measurement result includes an RSTD between the positioning node a and the positioning node b, an RSTD between the positioning node a and the positioning node c, and an RSTD between the positioning node a and the positioning node d.

The reference signal information includes at least: reference signal sending bandwidth, a reference signal sending time, a reference signal subframe quantity, reference signal frequency information, and reference signal muting information.

The reference signal muting information is used to represent whether a positioning node sends a reference signal within a reference signal period. Generally, whether a positioning node sends a reference signal within a reference signal period may be indicated in a binary manner. For example, if the terminal 102 can receive reference signals of six positioning nodes, the reference signal muting information may be 100000, 010000, 001000, or the like. 100000 indicates that a positioning node sends a reference signal within a first reference signal period.

Correspondingly, the network-side device 101 is further configured to: configure the reference signal information of each positioning node for each positioning node; set a positioning node index number for each positioning node, and determine geographical location corresponding to the positioning node index number; and associate each positioning node index number with reference signal information of a positioning node corresponding to each positioning node index number, to obtain a correspondence between the positioning node index number and the reference signal information.

Figure 3:
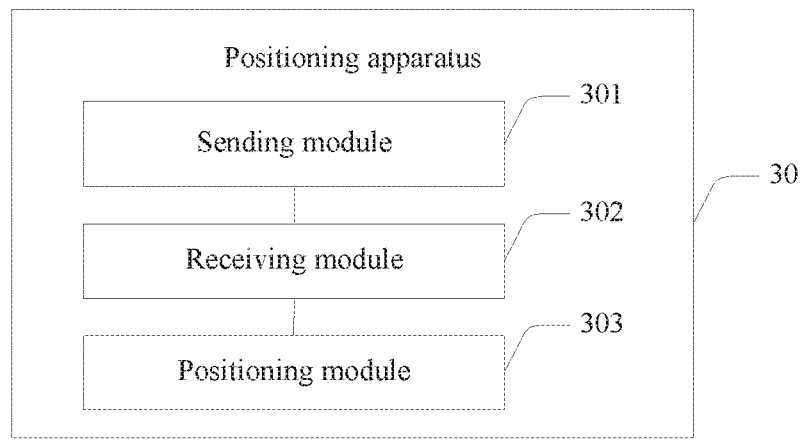
FIG. 3 is a schematic structural diagram of a positioning apparatus according to an embodiment of the present invention.

With reference to FIG. 1 and FIG. 2, the present invention provides a positioning apparatus 30. As shown in FIG. 3, the apparatus 30 may be the network-side device 101, and specifically includes: a sending module 301, a receiving module 302, and a positioning module 303.

The sending module 301 is configured to send auxiliary data information to a terminal, where the auxiliary data information is information required by the terminal to perform measurement on each positioning node, where the auxiliary data information includes a positioning node index number of each positioning nodes.

The receiving module 302 is configured to receive a positioning measurement result sent by the terminal, and provide the positioning measurement result to the positioning module 303, where the positioning measurement result includes a positioning measurement result corresponding to each positioning node index number, or a positioning measurement result corresponding to another positioning node index number relative to a reference positioning node index number.

The positioning module 303 is configured to determine a location of the terminal by using the positioning measurement result.

By means of the positioning apparatus provided in this embodiment of the present invention, the sending module sends auxiliary data information to a terminal, where the auxiliary data information is information required by the terminal to perform measurement on each positioning node, where the auxiliary data information includes a positioning node index number of each positioning node; the receiving module receives a positioning measurement result sent by the terminal, and provides the positioning measurement result to the positioning module, where the positioning measurement result includes a positioning measurement result corresponding to each positioning node index number, or a positioning measurement result corresponding to the other positioning node index number relative to a reference positioning node index number; and the positioning module determines a location of the terminal by using the positioning measurement result. Compared with that in the prior art, when positioning nodes (nodes that belong to a same cell) send radio wave propagation signals to a terminal, the terminal cannot identify the positioning nodes by using the received radio wave propagation signals, and therefore, positioning measurement performed by the terminal cannot be associated with a corresponding positioning node, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

Further optionally, the auxiliary data information further includes reference signal information, and a correspondence between the positioning node index numbers and the reference signal information, where the reference signal information includes at least: reference signal sending bandwidth, a reference signal sending time, a reference signal subframe quantity, reference signal frequency information, and reference signal muting information.

It should be noted that, the positioning node index number is located in a predetermined field in the auxiliary data information, where the predetermined field is any one of the following: a cell global identity (Cell Global Identity, CGI) field, an enhanced cell global identity (enhanced Cell Global Identity, eCGI) field, and an index number field.

In a 2G/3G cellular network, a positioning node index number may be located in the CGI field or the index number field in the auxiliary data information; in an LTE cellular network, a positioning node index number may be located in the eCGI field or the index number field in the auxiliary data information. The index number field is a new field in the auxiliary data information, and is used to store the positioning node index number. However, the CGI field or the eCGI field is an original field in the auxiliary data information. The CGI field (eCGI field) in the prior art is used to store a CGI (an eCGI). However, in this solution, the CGI or the eCGI is not information that is essential for a terminal to determine a positioning measurement result, and therefore the CGI field or the eCGI field may be used to store a positioning node index number, and the CGI (eCGI) is changed to a pseudo CGI (a pseudo eCGI), so that it is avoided to additionally add new signaling for the positioning node index number.

In summary, the auxiliary data information may include a physical cell ID, the CGI/eCGI, reference signal sequence information, reference signal information of positioning nodes, positioning node index numbers of the positioning nodes, and a correspondence between the positioning node index numbers and the reference signal information. The CGI/eCGI is optional information.

Figure 4:
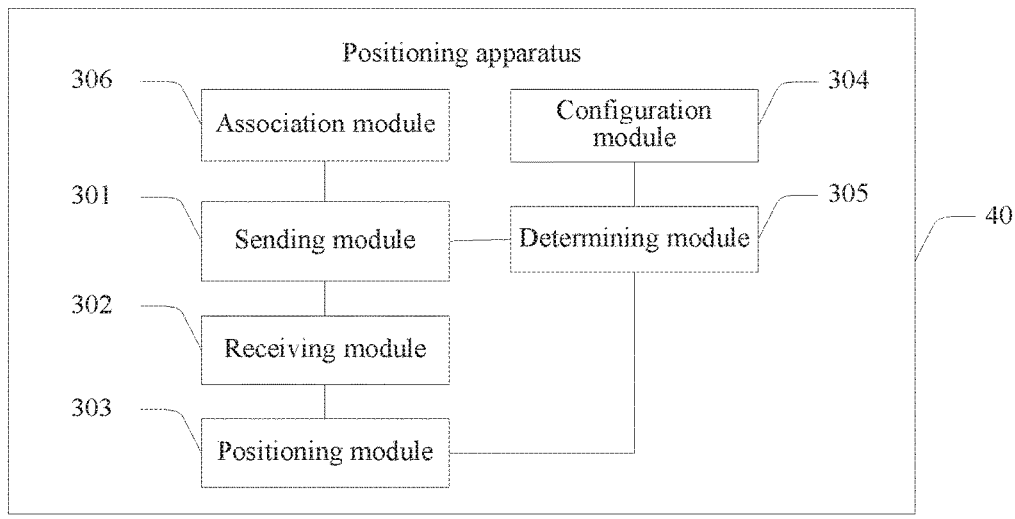
FIG. 4 is a schematic structural diagram of another positioning apparatus according to an embodiment of the present invention.

Further optionally, the present invention may further provide a positioning apparatus 40. As shown in FIG. 4, the apparatus 40 further includes: a configuration module 304, a determining module 305, and an association module 306.

The configuration module 304 is configured to: configure the reference signal information of each positioning node for each positioning node, where the reference signal information of each positioning node is used to instruct each positioning node to send reference signals, and set the positioning node index number for each positioning node; provide the reference signal information of each positioning node and each positioning node index number to the association module 306, and provide each positioning node index number to the determining module 305.

The determining module 305 is configured to determine a geographical location corresponding to each positioning node index number.

The geographical location that corresponds to each positioning node index number and that is determined by the determining module 305 is used by the positioning module 303 to determine a geographical location of a terminal.

The association module 306 is configured to associate each positioning node index number with reference signal information of a positioning node corresponding to each positioning node index number, to obtain a correspondence between the positioning node index number and the reference signal information.

Further optionally, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value.

The positioning module is specifically configured to: when the positioning measurement result is the reference signal received strength corresponding to each positioning node index number, select, by the network-side device, a location of a positioning node whose reference signal received strength is the maximum as the location of the terminal; or when the positioning measurement result is the RSTD measurement value corresponding to the other positioning node index number relative to the reference positioning node index number, select, by the network-side device, a location of a positioning node closest to the terminal as the location of the terminal, or determine, by the network-side device, the location of the terminal by using a predetermined algorithm.

Figure 5:
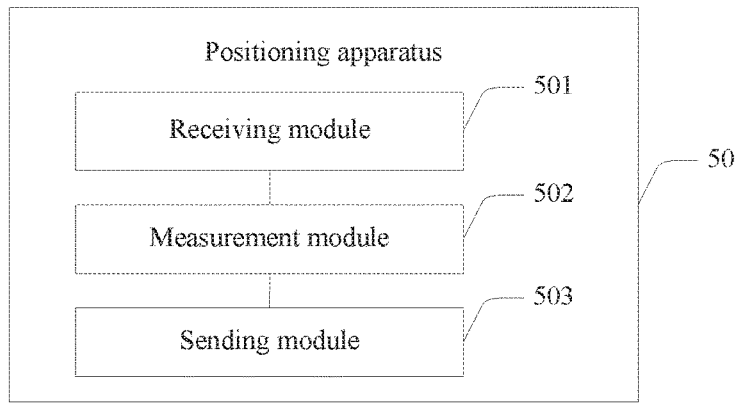
FIG. 5 is a schematic structural diagram of still another positioning apparatus according to an embodiment of the present invention.

With reference to FIG. 1 and FIG. 2, the present invention provides a positioning apparatus 50. As shown in FIG. 5, the apparatus 50 may be the terminal 102, and specifically includes: a receiving module 501, a measurement module 502, and a sending module 503.

The receiving module 501 is configured to: receive auxiliary data information sent by a network-side device, and provide the auxiliary data information to the measurement module 502, where the auxiliary data information is information required by the terminal to perform measurement on location reference signal of each positioning node, where the auxiliary data information includes a positioning node index number of each positioning nodes.

The measurement module 502 is configured to perform, by using the auxiliary data information, measurement on the location reference signal of each positioning node, to obtain a positioning measurement result, and provide the positioning measurement result to the sending module 503, where the positioning measurement result includes a positioning measurement result corresponding to each positioning node index number, or a positioning measurement result corresponding to another positioning node index number relative to a reference positioning node index number.

The sending module 503 is configured to send the positioning measurement result to the network-side device.

By means of the positioning apparatus provided in this embodiment of the present invention, the receiving module receives auxiliary data information sent by a network-side device, and provides the auxiliary data information to the measurement module, where the auxiliary data information is information required by a terminal to perform measurement on each positioning node, where the auxiliary data information includes a positioning node index number of each positioning node; the measurement module performs, by using the auxiliary data information, measurement on a reference signal sent by each positioning node, to obtain a positioning measurement result, and provides the positioning measurement result to the sending module, where the positioning measurement result includes a positioning measurement result corresponding to each positioning node index number, or a positioning measurement result that a reference positioning node index number separately corresponds to other positioning node index numbers; and the sending module sends the positioning measurement result to the network-side device. Compared with that in the prior art, when positioning nodes (nodes that belong to a same cell) send radio wave propagation signals to a terminal, the terminal cannot identify the positioning nodes by using the received radio wave propagation signals, and therefore, positioning measurement performed by the terminal cannot be associated with a corresponding positioning node, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

Further optionally, the auxiliary data information further includes reference signal information, and a correspondence between the positioning node index numbers and the reference signal information, where the reference signal information includes at least: reference signal sending bandwidth, a reference signal sending time, a reference signal subframe quantity, reference signal frequency information, and reference signal muting information.

It should be noted that, the positioning node index number is located in a predetermined field in the auxiliary data information, where the predetermined field is any one of the following: a CGI field, an eCGI field, and an index number field.

Figure 6:
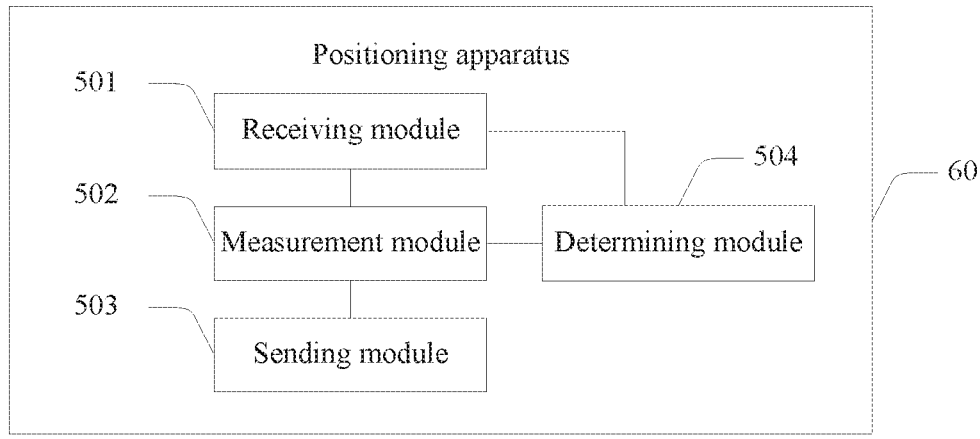
FIG. 6 is a schematic structural diagram of yet another positioning apparatus according to an embodiment of the present invention.

Further optionally, the present invention may further provide a positioning apparatus 60. As shown in FIG. 6, the apparatus 60 further includes: a determining module 504.

The receiving module is further configured to: receive, by using the auxiliary data information, the reference signal sent by each positioning node, and provide, to the determining module 504, the reference signal sent by each positioning nodes.

The determining module 504 is configured to: determine, by using the correspondence between the positioning node index numbers and the reference signal information, a positioning node index number corresponding to each reference signal, and provide the positioning node index number to the measurement module 502. Therefore, the measurement module 502 performs measurement on the location reference signals of the positioning nodes by using auxiliary data information and the positioning node index number, to obtain a positioning measurement result.

Further optionally, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value.

Figure 7:
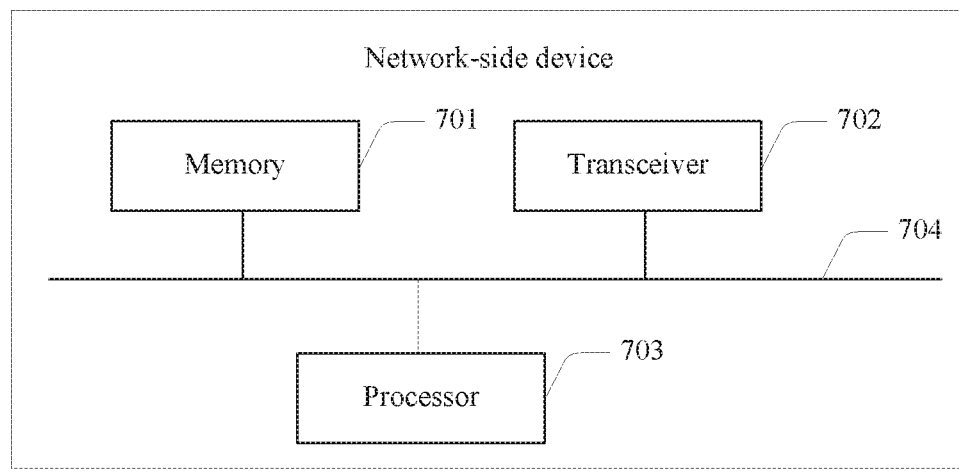
FIG. 7 is a structural diagram of hardware of a network-side device in a positioning system according to an embodiment of the present invention.

As shown in FIG. 7, FIG. 7 is a schematic structural diagram of hardware of a network-side device. The network-side device may include a memory 701, a transceiver 702, a processor 703, and a bus 704, where the memory 701, the transceiver 702, and the processor 703 are in communication connection with each other by using the bus 704.

The memory 701 may be a read-only memory (Read Only Memory, ROM), a static storage device, a dynamic storage device, or a random access memory (Random Access Memory, RAM). The memory 701 may store an operating system and another application program. When the technical solution provided in this embodiment of the present invention is implemented by using software and firmware, program code for implementing the technical solution provided in this embodiment of the present invention is stored in the memory 701, and is executed by the processor 703.

The transceiver 702 is used for communication between the apparatus and another device or a communications network (for example, but not limited to, an Ethernet, a radio access network (Radio Access Network, RAN), or a wireless local area network (Wireless Local Area Network, WLAN).

The processor 703 may be a general central processing unit (Central Processing Unit, CPU), a microprocessor, an application-specific integrated circuit (Application Specific Integrated Circuit, ASIC), or one or more integrated circuits, and is configured to execute a related program, so as to implement the technical solution provided in the embodiment of the present invention.

The bus 704 may include a path, through which information is transmitted between the parts (such as the memory 701, the transceiver 702, and the processor 703) of the apparatus.

It should be noted that, although the hardware shown in FIG. 7 includes only the memory 701, the transceiver 702, the processor 703, and the bus 704, in a specific implementation process, a person skilled in the art should understand that the terminal further includes another component that is essential for implementing normal running. In addition, a person skilled in the art should understand that, the terminal may further include a hardware component for implementing another function.

Specifically, when the network-side device shown in FIG. 7 is configured to implement the apparatuses shown in the embodiments in FIG. 3 and FIG. 4, the transceiver 702 in the apparatus is configured to: send auxiliary data information to a terminal, where the auxiliary data information is information required by the terminal to perform measurement on each positioning node, where the auxiliary data information includes a positioning node index number of each positioning node; and receive a positioning measurement result sent by the terminal, and provide the positioning measurement result to the processor, where the positioning measurement result includes a positioning measurement result corresponding to each positioning node index number, or a positioning measurement result corresponding to another positioning node index number relative to a reference positioning node index number.

The processor 703 is coupled to the memory 701 and the transceiver 702, is configured to control execution of the program instruction, and is specifically configured to determine a location of the terminal by using each positioning measurement result.

The positioning node index number is located in a predetermined field in the auxiliary data information, where the predetermined field is any one of the following: a CGI field, an eCGI field, and an index number field.

The auxiliary data information further includes reference signal information, and a correspondence between the positioning node index numbers and the reference signal information, where the reference signal information includes at least: reference signal sending bandwidth, a reference signal sending time, a reference signal subframe quantity, reference signal frequency information, and reference signal muting information.

Further optionally, the processor 703 is further configured to: configure the reference signal information of each positioning node for each positioning node, where the reference signal information of each positioning node is used to instruct each positioning node to send the reference signal and set the positioning node index number for each positioning node; determine a geographical location corresponding to each positioning node index number; and associate each positioning node index number with reference signal information of a positioning node corresponding to each positioning node index number, to obtain a correspondence between the positioning node index number and the reference signal information.

In addition, it should be noted that, when the positioning measurement result includes the positioning measurement result corresponding to each positioning node index number, the positioning measurement result is reference signal received strength; or when the positioning measurement result includes the positioning measurement result corresponding to another positioning node index number relative to the reference positioning node index number, the positioning measurement result is a reference signal time difference RSTD measurement value.

Specifically, when the positioning measurement result is the reference signal received strength corresponding to each positioning node index number, the processor 703 selects a location of a positioning node whose reference signal received strength is the maximum as the location of the terminal; or when the positioning measurement result is the RSTD measurement value corresponding to the other positioning node index number relative to the reference positioning node index number, the processor 703 selects a location of a positioning node closest to the terminal as the location of the terminal, or the network-side device determines the location of the terminal by using a predetermined algorithm.

By means of the positioning apparatus provided in this embodiment of the present invention, the memory stores information that includes a program instruction; the transceiver sends auxiliary data information to a terminal, where the auxiliary data information is information required by the terminal to perform measurement on each positioning node, where the auxiliary data information includes a positioning node index number of each positioning node, receives a positioning measurement result sent by the terminal, and provides the positioning measurement result to the processor, where the positioning measurement result includes a positioning measurement result corresponding to each positioning node index number, or a positioning measurement result corresponding to another positioning node index number relative to a reference positioning node index number; and the processor is coupled to the memory and the transceiver, is configured to control execution of the program instruction, and is specifically configured to determine a location of the terminal by using the positioning measurement result. Compared with that in the prior art, when positioning nodes (nodes that belong to a same cell) send radio wave propagation signals to a terminal, the terminal cannot identify the positioning nodes by using the received radio wave propagation signals, and therefore, positioning measurement performed by the terminal cannot be associated with a corresponding positioning node, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

Figure 8:
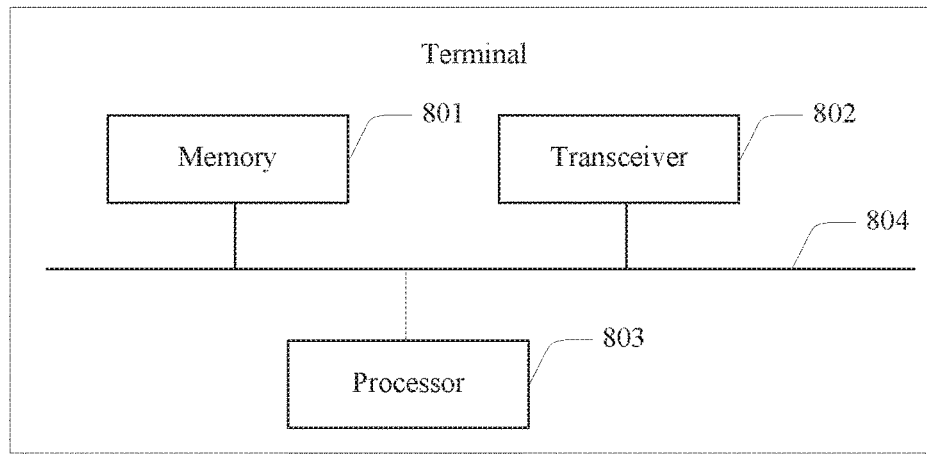
FIG. 8 is a structural diagram of hardware of a terminal in a positioning system according to an embodiment of the present invention.

As shown in FIG. 8, FIG. 8 is a schematic structural diagram of hardware of a terminal. The terminal may include a memory 801, a transceiver 802, a processor 803, and a bus 804. The memory 801, the transceiver 802, and the processor 803 are in communication connection with each other by using the bus 804.

The memory 801 may be a read-only memory (Read Only Memory, ROM), a static storage device, a dynamic storage device, or a random access memory (Random Access Memory, RAM). The memory 801 may store an operating system and another application program. When the technical solution provided in this embodiment of the present invention is implemented by using software and firmware, program code for implementing the technical solution provided in this embodiment of the present invention is stored in the memory 801, and is executed by the processor 803.

The transceiver 802 is used for communication between the apparatus and another device or a communications network (for example, but not limited to, an Ethernet, a radio access network (Radio Access Network, RAN), or a wireless local area network (Wireless Local Area Network, WLAN).

The processor 803 may be a general central processing unit (Central Processing Unit, CPU), a microprocessor, an application-specific integrated circuit (Application Specific Integrated Circuit, ASIC), or one or more integrated circuits, and is configured to execute a related program, so as to implement the technical solution provided in the embodiment of the present invention.

The bus 804 may include a path, through which information is transmitted between the parts (such as the memory 801, the transceiver 802, and the processor 803) of the apparatus.

It should be noted that, although the hardware shown in FIG. 8 includes only the memory 801, the transceiver 802, the processor 803, and the bus 804, in a specific implementation process, a person skilled in the art should understand that the terminal further includes another component that is essential for implementing normal running. In addition, a person skilled in the art should understand that, the terminal may further include a hardware component for implementing another function.

Specifically, when the terminal shown in FIG. 8 is configured to implement the apparatuses shown in the embodiments in FIG. 5 and FIG. 6, the transceiver 802 in the apparatus is configured to receive auxiliary data information sent by a network-side device, and provide the auxiliary data information to the processor 803, where the auxiliary data information is information required by the terminal to perform measurement on each positioning node, where the auxiliary data information includes a positioning node index number of each positioning node.

The processor 803 is coupled to the memory 801 and the transceiver 802, is configured to control execution of the program instruction, and is specifically configured to: perform, by using the auxiliary data information, measurement on a reference signal sent by each positioning node, to obtain a positioning measurement result, and provide the positioning measurement result to the transceiver 802, where the positioning measurement result includes a positioning measurement result corresponding to each positioning node index number, or a positioning measurement result corresponding to another positioning node index number relative to a reference positioning node index number.

The transceiver 802 is configured to send the positioning measurement result to the network-side device.

The positioning node index number is located in a predetermined field in the auxiliary data information, where the predetermined field is any one of the following: a CGI field, an eCGI field, and an index number field.

The auxiliary data information further includes reference signal information, and a correspondence between the positioning node index numbers and the reference signal information, where the reference signal information includes at least: reference signal sending bandwidth, a reference signal sending time, a reference signal subframe quantity, reference signal frequency information, and reference signal muting information.

Further optionally, the transceiver 802 is further configured to receive, by using the auxiliary data information, the reference signal sent by each positioning node, and provide, to the processor 803, the reference signal sent by each positioning node. The processor 803 determines, by using the correspondence between the positioning node index number and the reference signal information, a positioning node index number corresponding to each reference signal, and performs measurement on each positioning node by using the auxiliary data information and the positioning node index number, to obtain a positioning measurement result.

When the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is an RSTD measurement value.

By means of the positioning apparatus provided in this embodiment of the present invention, the memory stores information that includes a program instruction; the transceiver receives auxiliary data information sent by a network-side device, and provides the auxiliary data information to the processor, where the auxiliary data information is information required by a terminal to perform measurement on each positioning node, where the auxiliary data information includes a positioning node index number of each positioning node; the processor is coupled to the memory and the transceiver, is configured to control execution of the program instruction, and is specifically configured to: perform, by using the auxiliary data information, measurement on a reference signal sent by each positioning node, to obtain a positioning measurement result, and provide the positioning measurement result to the transceiver, where the positioning measurement result includes a positioning measurement result corresponding to each positioning node index number, or a positioning measurement result corresponding to another positioning node index number relative to a reference positioning node index number separately corresponds to other positioning node index numbers; and the transceiver sends the positioning measurement result to the network-side device. Compared with that in the prior art, when positioning nodes (nodes that belong to a same cell) send radio wave propagation signals to a terminal, the terminal cannot identify the positioning nodes by using the received radio wave propagation signals, and therefore, positioning measurement performed by the terminal cannot be associated with a corresponding positioning node, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

Figure 9:
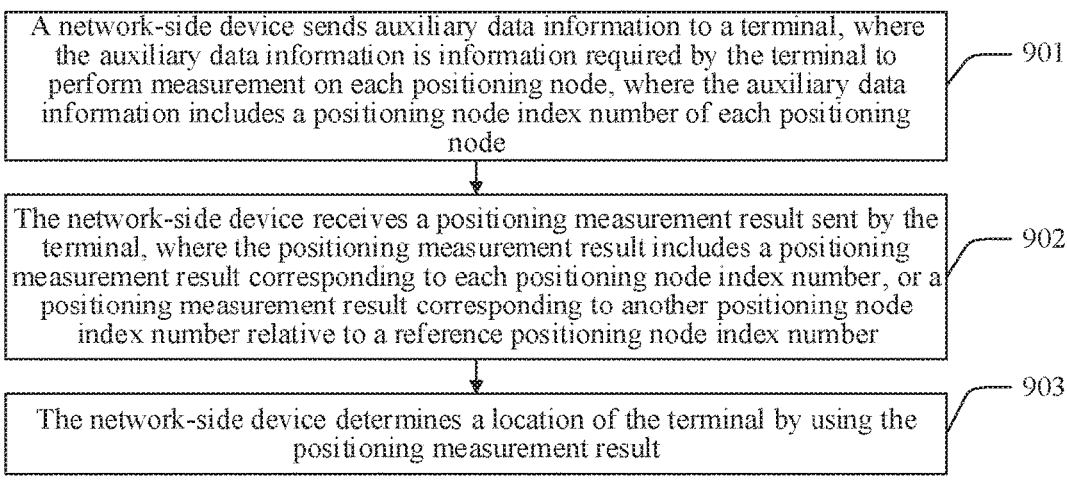
FIG. 9 is a flowchart of a positioning method according to an embodiment of the present invention.

With reference to FIG. 3 and FIG. 4, an embodiment of the present invention provides a positioning method. As shown in FIG. 9, the method specifically includes:

901: A network-side device sends auxiliary data information to a terminal, where the auxiliary data information is information required by the terminal to perform measurement on each positioning node, where the auxiliary data information includes a positioning node index number of each positioning node.

902: The network-side device receives a positioning measurement result sent by the terminal, where the positioning measurement result includes a positioning measurement result corresponding to each positioning node index number, or a positioning measurement result corresponding to another positioning node index number relative to a reference positioning node index number.

903: The network-side device determines a location of the terminal by using the positioning measurement result.

By means of the positioning method provided in this embodiment of the present invention, compared with that in the prior art, when positioning nodes (nodes that belong to a same cell) send radio wave propagation signals to a terminal, the terminal cannot identify the positioning nodes by using the received radio wave propagation signals, and therefore, locations of the terminal and the positioning nodes cannot be obtained, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

Further optionally, the positioning node index number is located in a predetermined field in the auxiliary data information, where the predetermined field is any one of the following: a CGI field, an eCGI field, and an index number field.

In a 2G/3G cellular network, a positioning node index number may be located in the CGI field or the index number field in the auxiliary data information; in an LTE cellular network, a positioning node index number may be located in the eCGI field or the index number field in the auxiliary data information. The index number field is a new field in the auxiliary data information, and is used to store the positioning node index number. However, the CGI field or the eCGI field is an original field in the auxiliary data information. The CGI field (eCGI field) in the prior art is used to store a CGI (an eCGI). However, in this solution, the CGI or the eCGI is not information that is essential for a terminal to determine a positioning measurement result, and therefore the CGI field or the eCGI field may be used to store a positioning node index number, and the CGI (eCGI) is changed to a pseudo CGI (a pseudo eCGI), so that it is avoided to additionally add new signaling for the positioning node index number.

In summary, the auxiliary data information may include a physical cell ID, the CGI/eCGI, reference information information, the positioning node index numbers, and the correspondence between the positioning node index numbers and the reference signal information. The CGI/eCGI is optional information.

Figures 10, 11:
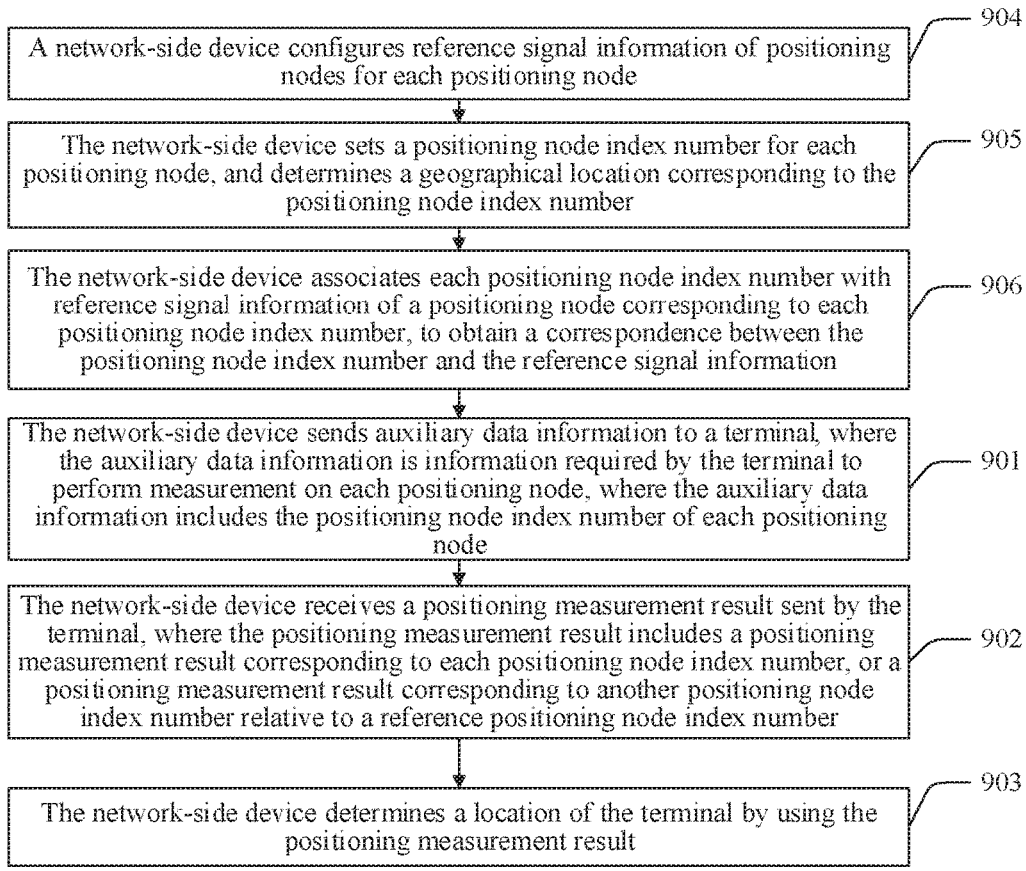
FIG. 10 is a flowchart of another positioning method according to an embodiment of the present invention.
FIG. 11 is a schematic diagram of a reference signal sending manner of a positioning node in a positioning method according to an embodiment of the present invention.

Further optionally, as shown in FIG. 10, before step 901 in FIG. 9, this solution may further include:

904: The network-side device configures a reference signal information of each positioning node for each positioning node.

The reference signal information may include reference signal sending bandwidth, a reference signal sending time, a reference signal subframe quantity, reference signal frequency information, reference signal muting information, reference signal sequence information, and the like.

The positioning nodes in this solution are positioning nodes that belong to one cell. Therefore, the reference signal sending bandwidth, the reference signal frequency information, the reference signal sequence information, and the like that correspond to the positioning nodes are all the same, and therefore need to be distinguished by using different reference signal sending manners of the positioning nodes. A reference signal sending manner includes a reference signal sending time, a reference signal subframe quantity, and reference signal muting information. As shown in FIG. 11, the present invention provides a reference signal sending manner of a positioning node.

In FIG. 11, within a sending period of each reference signal, only a particular positioning node or some particular positioning nodes are allowed to send reference signals. In the figure, 1 represents sending a reference signal, and 0 represents not sending a reference signal. Therefore, a positioning node 1 sends a reference signal in the first subframe of a first reference signal period, and other positioning nodes 2 to 6 do not send reference signals. Therefore, although sequences of the reference signals sent by these positioning nodes are the same, in the first subframe of the first reference signal period, a terminal receives the reference signal sent by the positioning node 1 (when the positioning node 1 sends the reference signal, the positioning nodes 2, 3, 4, 5, and 6 do not send reference signals); in the first subframe of a second reference signal period, the terminal receives the reference signal sent by the positioning node 2 (when the positioning node 2 sends the reference signal, the positioning nodes 1, 3, 4, 5, and 6 do not send reference signals); the rest can be deduced by analogy. It may be understood that, a positioning node index number of the positioning node 1 is 1; a positioning node index number of the positioning node 2 is 2; a positioning node index number of the positioning node 3 is 3; a positioning node index number of the positioning node 4 is 4; a positioning node index number of the positioning node 5 is 5; and a positioning node index number of the positioning node 6 is 6. In addition, the present invention does not limit a representation manner of a positioning node index number, which may be a number, a letter, or the like.

From the perspective of a network side, positioning nodes do not send reference signals within each reference signal period. Corresponding to FIG. 11, the positioning node 1 sends a reference signal in the first subframe of the first reference signal period, the positioning node 2 sends a reference signal in the first subframe of the second reference signal period, and the rest can be deduced by analogy. Therefore, the reference signal muting information is used to represent whether a positioning node sends a reference signal within a reference signal period. Each positioning node has one time pattern (time pattern) corresponding to a reference signal muting message. Corresponding to FIG. 5, the time patterns are respectively: the positioning node 1: 100000; the positioning node 2: 010000; the positioning node 3: 001000; the positioning node 4: 000100; the positioning node 5: 000010; and the positioning node 6: 000001.

It should be noted that, the manner shown in FIG. 11 is abstracted by using the reference signal sending manner. A specific manner changes according to an actual situation.

Specifically, the reference signal sending time is used to indicate that a reference signal is sent at a specified time periodically, that is, represent that the reference signal begins to be sent in which subframe in which radio frame (each radio frame includes 10 subframes). At first, a reference signal period is divided into four grades, where period intervals are respectively 160 ms, 320 ms, 640 ms, and 1280 ms. For details, refer to Table 1, which is specifically as follows:

TABLE 1

| Reference signal index value $I_{PRS}$ | Reference signal period $T_{PRS}$ | Reference signal subframe offset $\Delta_{PRS}$ |
| --- | --- | --- |
| 0 to 159 | 160 | $I_{PRS}$ |
| 160 to 479 | 320 | $I_{PRS} - 160$ |
| 480 to 1119 | 640 | $I_{PRS} - 480$ |
| 1120 to 2399 | 1280 | $I_{PRS} - 1120$ |
| 2400 to 4095 | Predetermined value | |

In Table 1, when the reference signal index value $I_{PRS}$ is 41, the corresponding reference signal period $T_{PRS}$ is 160 ms, and the reference signal subframe offset $\Delta_{PRS}$ is 41, which indicates that a specific subframe for sending is the $41^{st}$ subframe at 160 ms. That is, a positioning node sends a reference signal in the $41^{st}$ subframe.

When the reference signal index value $I_{PRS}$ is 191, the corresponding reference signal period $T_{PRS}$ is 320 ms, and the reference signal subframe offset $\Delta_{PRS}$ is 191−160=31, which indicates that a specific subframe for sending is the $31^{st}$ subframe at 320 ms. That is, a positioning node sends a reference signal in the $31^{st}$ subframe.

When the reference signal index value $I_{PRS}$ is 640, the corresponding reference signal period $T_{PRS}$ is 640 ms, and the reference signal subframe offset $\Delta_{PRS}$ is 640−480=160, which indicates that a specific subframe for sending is the $160^{th}$ subframe at 640 ms. That is, a positioning node sends a reference signal in the $160^{th}$ subframe. The rest can be deduced accordingly, and details are not described herein.

It should be noted that, for an example of 41 ms, if there is no reference signal muting information, a positioning node sends a reference signal at the $41^{st}$ ms, $201^{st}$ ms, $361^{st}$ ms, $521^{st}$ ms, $681^{st}$ ms, $841^{st}$ ms, .... When reference signal muting information 100000 is used, it means that the positioning node sends a reference signal only at the $41^{st}$ ms, and no reference signal is sent at other moments. For example, in FIG. 11, reference signal index values $I_{PRS}$ of positioning nodes 1 to 6 are all 1, the reference signal period $T_{PRS}$ is 160 ms, and the reference signal subframe offset $\Delta_{PRS}$ is 1, which indicates that each positioning node sends a reference signal at the $1^{st}$ ms, $161^{st}$ ms, $321^{st}$ ms, $481^{st}$ ms, $641^{st}$ ms, $801^{st}$ ms, .... However, reference signal muting information corresponding to each positioning node is different, which causes that the positioning node 1 sends a reference signal only at the $1^{st}$ ms (the first subframe), the positioning node 2 sends a reference signal only at the $161^{st}$ ms (the $161^{st}$ subframe), the positioning node 3 sends a reference signal only at the $321^{st}$ ms (the $321^{st}$ subframe), the positioning node 4 sends a reference signal only at the $481^{st}$ ms (the $481^{st}$ subframe), the positioning node 5 sends a reference signal only at the $641^{st}$ ms (the $641^{st}$ subframe), and the positioning node 6 sends a reference signal only at the $801^{st}$ ms (the $801^{st}$ subframe).

905: The network-side device sets the positioning node index number for each positioning node, and determines a geographical location corresponding to each positioning node index number.

The geographical location corresponding to each positioning node index number is used by the network-side device to determine the geographical location of the terminal. When determining a positioning node index number that is used as the geographical location of the terminal, the network-side device may determine the geographical location of the terminal according to a geographical location corresponding to the positioning node index number.

906: The network-side device associates each positioning node index number with reference signal information of a positioning node corresponding to each positioning node index number, to obtain a correspondence between the positioning node index number and the reference signal information.

The correspondence between the positioning node index number and the reference signal information may be indicated by using a manner of a set. For example, an auxiliary data set: positioning node reference signal information 1 to N.

Positioning node reference signal information 1: {
Positioning node index number of the reference positioning node 1
The cell ID of the reference positioning node 1
Reference signal information of the reference positioning node 1}
Positioning node reference signal information 2: {
Positioning node index number of the reference positioning node 2
The cell ID of the reference positioning node 2
Reference signal information of the reference positioning node 2}
...
Positioning node reference signal information N: {
Positioning node index number of the reference positioning node N
The cell ID of the reference positioning node N Reference signal information of the reference positioning node N} where it may be understood that, a cell ID of a reference positioning node may be a physical cell ID; or a cell ID of a reference positioning node may include a physical cell ID and a global cell ID.

The information included in the auxiliary data set is not limited to this.

Further optionally, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is a reference signal time difference RSTD measurement value.

It should be further noted that, in step 903 in FIG. 9, the determining, by the network-side device, the location of the terminal by using each positioning measurement result specifically includes:

when the positioning measurement result is the reference signal received strength corresponding to each positioning node index number, selecting, by the network-side device, a location of a positioning node whose reference signal received strength is the maximum as the location of the terminal; or when the positioning measurement result is the RSTD measurement value corresponding to the other positioning node index number relative to the reference positioning node index number separately corresponds to the other positioning node index numbers, selecting, by the network-side device, a location of a positioning node closest to the terminal as the location of the terminal, or determining, by the network-side device, the location of the terminal by using a predetermined algorithm. The predetermined algorithm may be a hyperbola determining method, a trilateration method, or the like.

Figure 12:
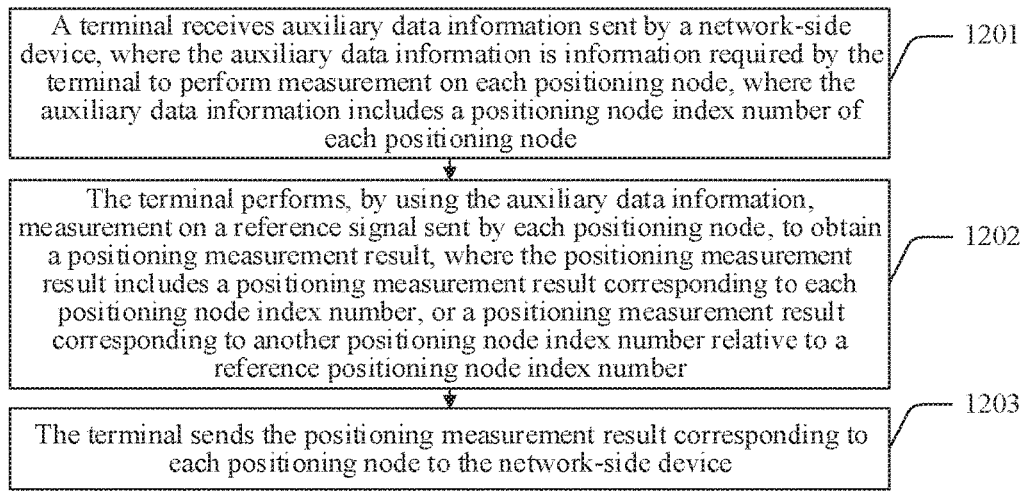
FIG. 12 is a flowchart of still another positioning method according to an embodiment of the present invention.

With reference to FIG. 5 and FIG. 6, an embodiment of the present invention provides another positioning method. As shown in FIG. 12, the method specifically includes:

1201: A terminal receives auxiliary data information sent by a network-side device, where the auxiliary data information is information required by the terminal to perform measurement on each positioning node, where the auxiliary data information includes a positioning node index number of each positioning node.

1202: The terminal performs, by using the auxiliary data information, measurement on reference signals sent by the positioning nodes, to obtain a positioning measurement result, where the positioning measurement result includes a positioning measurement result corresponding to each positioning node index number, or a positioning measurement result corresponding to another positioning node index number relative to a reference positioning node index number.

1203: The terminal sends the positioning measurement result to the network-side device.

By means of the positioning method provided in this embodiment of the present invention, compared with that in the prior art, when positioning nodes (nodes that belong to a same cell) send radio wave propagation signals to a terminal, the terminal cannot identify the positioning nodes by using the received radio wave propagation signals, and therefore, positioning measurement performed by the terminal cannot be associated with a corresponding positioning node, which causes a problem that the terminal cannot be precisely located, in this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

Further optionally, the positioning node index number is located in a predetermined field in the auxiliary data information, where the predetermined field is any one of the following: a CGI field, an eCGI field, and an index number field.

Further optionally, the auxiliary data information further includes reference signal information, and a correspondence between the positioning node index numbers and the reference signal information, where the reference signal information includes at least: reference signal sending bandwidth, a reference signal sending time, a reference signal subframe quantity, reference signal frequency information, and reference signal muting information.

Figure 13:
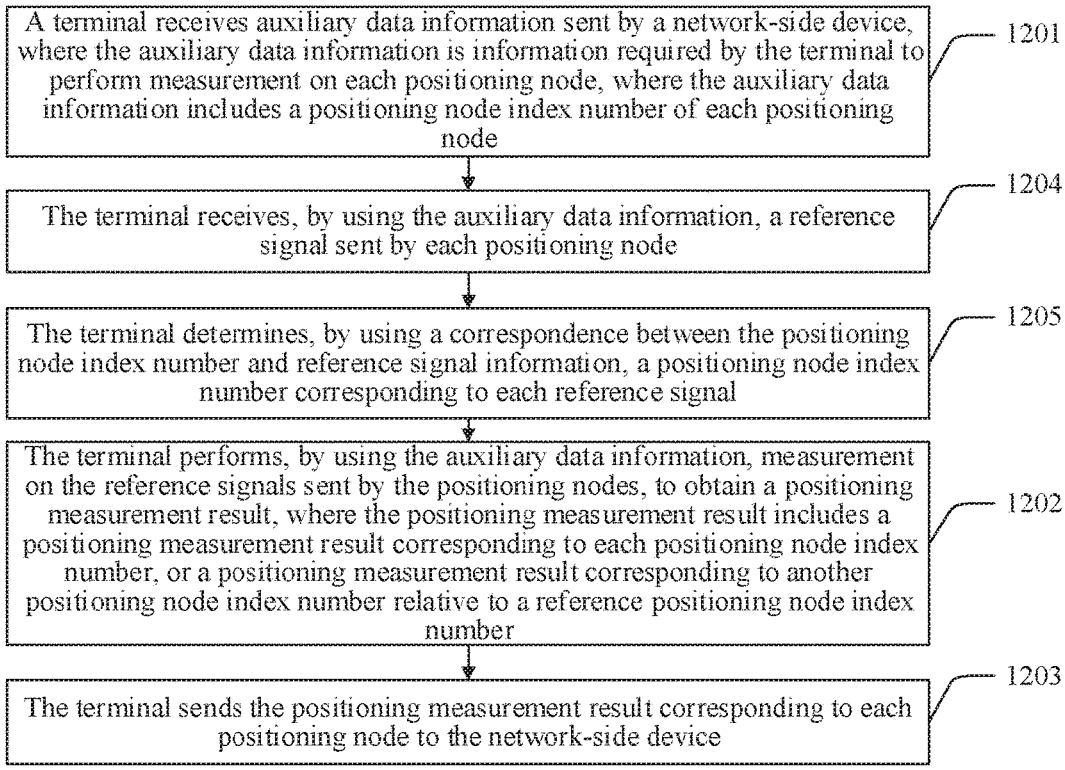
FIG. 13 is a flowchart of yet another positioning method according to an embodiment of the present invention.

Further optionally, as shown in FIG. 13, before step 1202 in FIG. 12, this solution may further include:

1204: The terminal receives, by using the auxiliary data information, the reference signals sent by each positioning node.

A reference signal may be a radio wave propagation signal.

The auxiliary data information includes the positioning node index number of the positioning node, the reference signal information of the positioning node, the correspondence between the positioning node index number and the reference signal information, reference signal sequence information, and the like.

The terminal receives, by using the reference signal information of the positioning nodes and the reference signal sequence information, the reference signal information sent by the positioning nodes.

1205: The terminal determines, by using the correspondence between the positioning node index numbers and the reference signal information, a positioning node index number corresponding to each reference signal.

For example, when reference signal information received by a terminal: reference signal sending bandwidth is 1 M, a reference signal sending time is the 41$^{st}$ subframe, a reference signal subframe quantity is one, reference signal frequency information is 950 MHZ, and reference signal muting information is 100000, it is determined, by using the reference signal information and a correspondence between a positioning node index number and the reference signal information, that a positioning node index number corresponding to the reference signal is 1.

Further optionally, when the positioning measurement result includes the positioning measurement result corresponding to each positioning node index number, the positioning measurement result is reference signal received strength; or when the positioning measurement result includes the positioning measurement result corresponding to the other positioning node index number relative to the reference positioning node index number, the positioning measurement result is an RSTD measurement value.

Further, it should be noted that, in step 1202 in FIG. 12, the terminal determines, by using the auxiliary data information and the reference signals sent by the positioning nodes, the positioning measurement results corresponding to the positioning node index numbers. When the terminal chooses to measure signal strength of a reference signal, the terminal measures each reference signal received strength of reception. When the terminal chooses to measure an RSTD measurement value of a reference signal, the terminal first acquires receiving times of received reference signals sent by positioning nodes, and then compares a time difference of receiving a reference signal between a reference positioning node that is delivered by a network-side device in advance and that is used as a positioning reference point and other positioning nodes. The terminal obtains, by using time differences of receiving a reference signal between the reference positioning node and the other positioning nodes respectively, an RSTD measurement value that the reference positioning node index number separately corresponds to the other positioning node index numbers.

For example, it is assumed that a terminal receives reference signals sent by two positioning nodes (the first positioning node and the second positioning node), and a positioning measurement result includes an RSTD measurement value that a reference positioning node index number separately corresponds to other positioning node index numbers, and then, after the terminal completes performing step 1201 to step 1206, the positioning measurement result includes:

physical cell ID of the first positioning node: physical cell ID of the first positioning node;

evolved global cell ID of the first positioning node: evolved global cell ID of the first positioning node;

reference signal frequency information of the first positioning node: reference signal sending frequency of the first positioning node;

positioning node index number of the first positioning node: 1;

physical cell ID of the second positioning node: physical cell ID of the second positioning node;

evolved global cell ID of the second positioning node: evolved global cell ID of the second positioning node;

reference signal frequency information of the second positioning node: reference signal sending frequency of the second positioning node;

positioning node index number of the second positioning node: 2; and positioning measurement result: RSTD measurement values for 1 and 2.

Figure 14A:
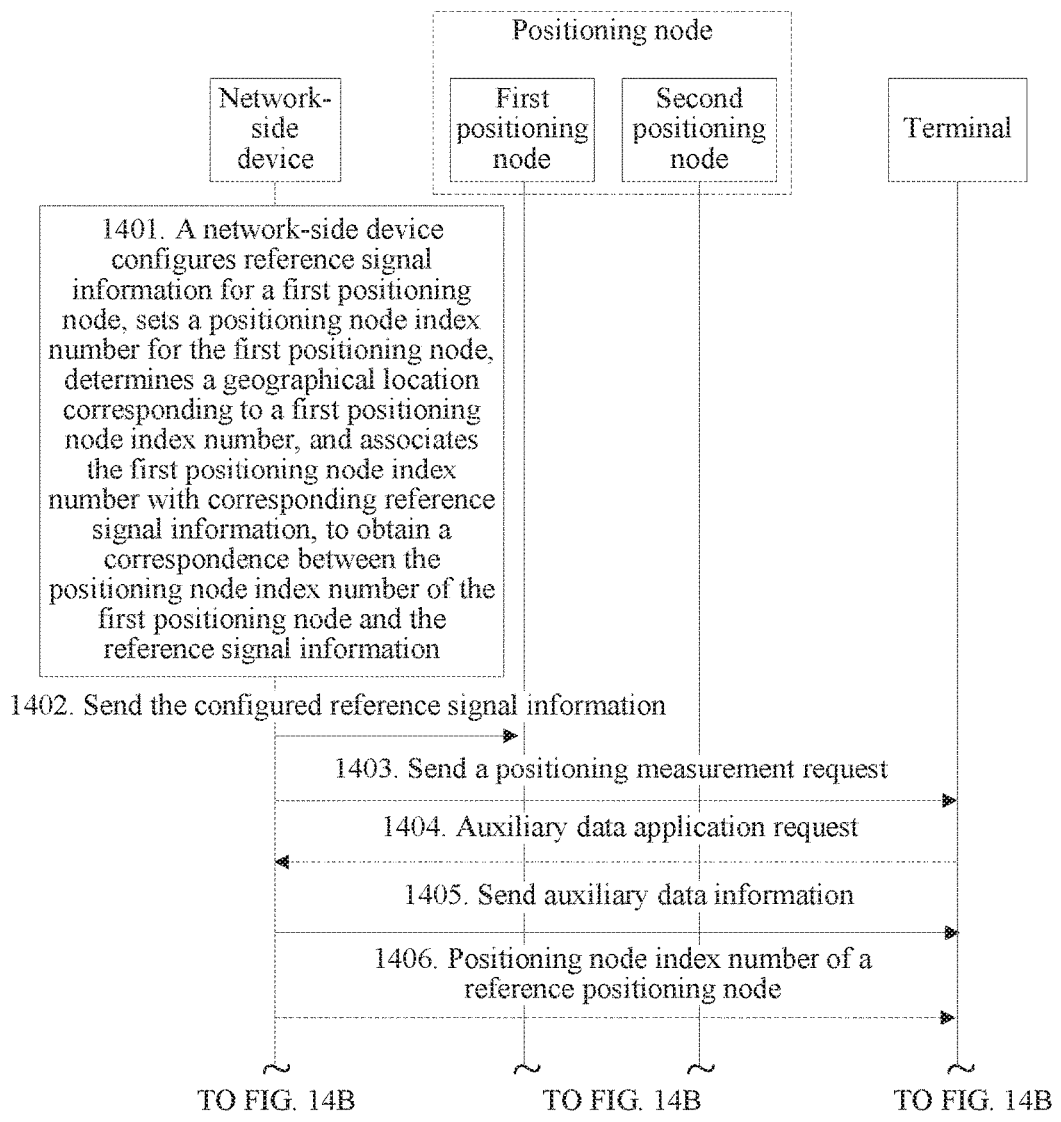
FIG. 14A and FIG. 14B are a flowchart of still yet another positioning method according to an embodiment of the present invention.
Figure 14B:
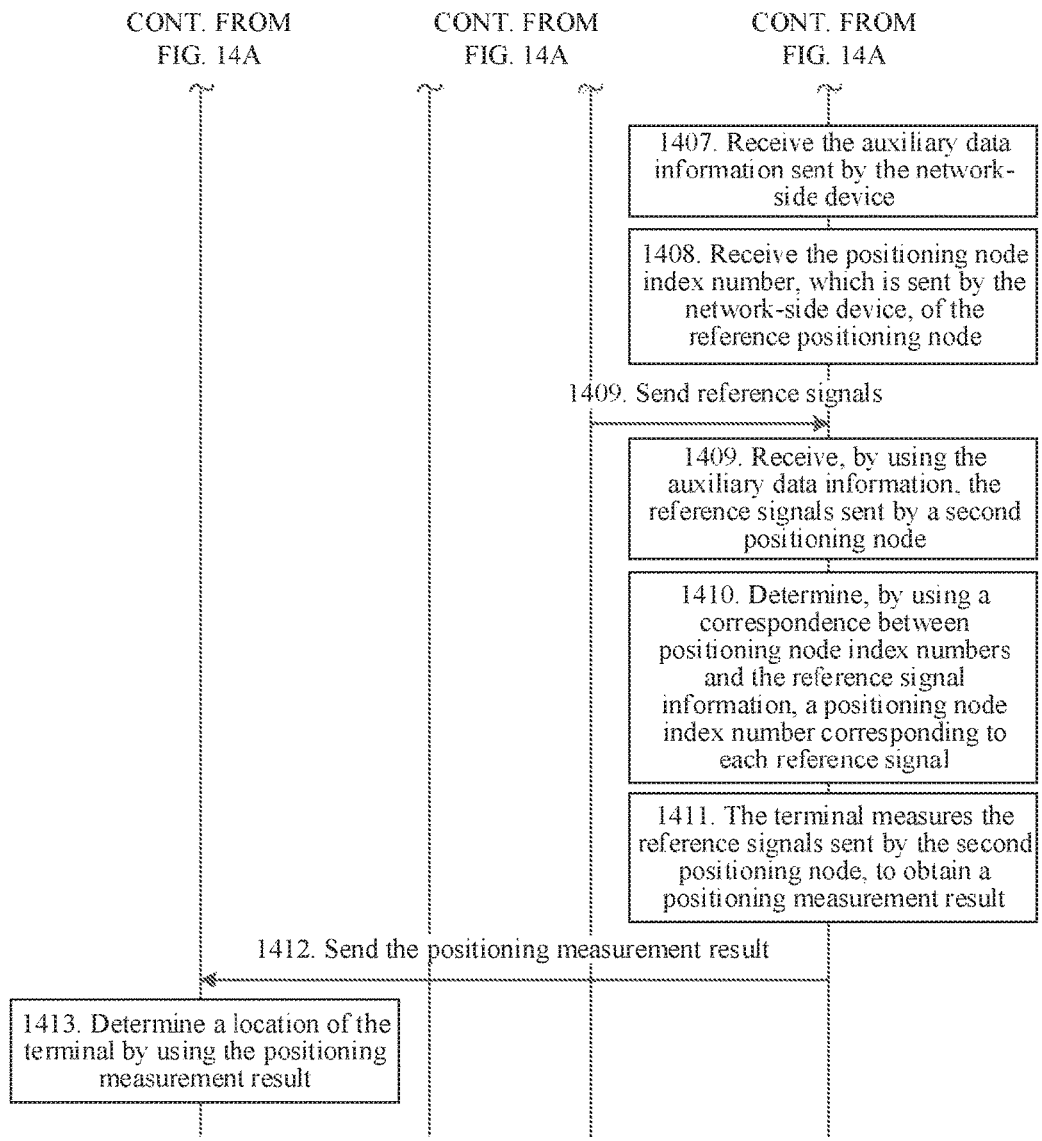

With reference to FIG. 9 to FIG. 13, the present invention may further provide a positioning method. As shown in FIG. 14A and FIG. 14B, the method includes:

1401: A network-side device configures reference signal information for a first positioning node, sets a positioning node index number for the first positioning node, determines a geographical location corresponding to a first positioning node index number, and associates the first positioning node index number with corresponding reference signal information, to obtain a correspondence between the positioning node index number of the first positioning node and the reference signal information.

The first positioning node may be seen as all positioning nodes within a management area of the network-side device.

1402: The network-side device sends the configured reference signal information to the first positioning node.

1403: The network-side device sends a positioning measurement request to a terminal.

The positioning measurement request is used to instruct the terminal to perform positioning measurement.

1404: The terminal sends an auxiliary data application request to the network-side device.

The auxiliary data application request is used to instruct the network-side device to send auxiliary data information to the terminal.

Step 1404 is an optional step. In the present invention, the network-side device may directly perform step 1405 after sending the positioning measurement request to the terminal.

1405: The network-side device sends auxiliary data information to the terminal.

1406: The network-side device sends a positioning node index number of a reference positioning node to the terminal.

Step 1406 is an optional step. When the terminal does not use an RSTD measurement value, and instead uses another parameter of a reference signal, this step does not need to be performed.

Optionally, a positioning node index number of a reference positioning node may be directly placed in auxiliary data information.

1407: The terminal receives the auxiliary data information sent by the network-side device.

1408: The terminal receives the positioning node index number, which is sent by the network-side device, of the reference positioning node.

Correspondingly, step 1408 is an optional step. When the terminal does not use an RSTD measurement value, and instead uses another parameter of a reference signal, this step does not need to be performed.

The reference positioning node is one positioning node in the first positioning node.

1409: The terminal receives, by using the auxiliary data information, reference signals sent by a second positioning node.

The second positioning node is a positioning node corresponding to a reference signal that can be received by the terminal. It may be understood that, the first positioning node includes the second positioning node.

1410: The terminal determines, by using a correspondence between positioning node index numbers and the reference signal information, a positioning node index number corresponding to each reference signal.

1411: The terminal measures the reference signals sent by the second positioning node, to obtain a positioning measurement result.

1412: The terminal sends the positioning measurement result to the network-side device.

1413: The network-side device determines a location of the terminal by using the positioning measurement result.

In this solution, a network-side device distinguishes, by using positioning node index numbers, different positioning nodes that belong to a same cell, so that after receiving reference signals sent by the positioning nodes, a terminal can distinguish the reference signals, and then provides a determined positioning measurement result to the network-side device, and the network-side device can precisely locate the terminal by using the positioning measurement result.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning apparatus, comprising:
a memory, configured to store information that comprises a program instruction;
a transceiver, configured to:
send auxiliary data information to a terminal for enabling the terminal to perform a reference signal time difference (RSTD) measurement on each positioning node of a same cell, wherein the auxiliary data information comprises an identity of the each positioning node of the same cell, the identity is configured to distinguish different positioning nodes belong to the same cell, and
receive an RSTD measurement result sent by the terminal; and
a processor coupled to the transceiver and to the memory, and configured to control execution of the program instruction, and configured to determine a location of the terminal by a predetermined algorithm and the received RSTD measurement result.

2. The positioning apparatus according to claim 1, wherein the auxiliary data information further comprises:
reference signal information of the each positioning node of the same cell and a correspondence between the identity of each positioning node and the reference signal information, and wherein the reference signal information of the each positioning node of the same cell comprises at least one of:
reference signal sending bandwidth;
reference signal sending time;
reference signal subframe quantity;
reference signal frequency information; or
reference signal muting information.

3. A terminal, comprising:
a memory, configured to store information that comprises a program instruction;
a transceiver, configured to:
receive auxiliary data information sent by a network-side device, wherein the auxiliary data information comprises an identity of each positioning node of a same cell, the identity is configured to distinguish different positioning nodes belong to the same cell;
a processor coupled to the transceiver, and configured to:
perform, by using the auxiliary data information, a reference signal time difference (RSTD) measurement on a reference signal sent by the each positioning node of the same cell, to obtain a RSTD measurement result; and
wherein the transceiver is further configured to send the RSTD measurement result to the network-side device.

4. The terminal according to claim 3, wherein the auxiliary data information further comprises:
reference signal information of the each positioning node of the same cell and a correspondence between the identity of the each positioning node of the same cell and the reference signal information, wherein the reference signal information of the each positioning node of the same cell comprises at least one of:
reference signal sending bandwidth;
reference signal sending time;
reference signal subframe quantity;
reference signal frequency information; or
reference signal muting information.

5. The terminal according to claim 4, wherein:
the transceiver is further configured to:
receive, by using the auxiliary data information, the reference signal sent by the each positioning node of the same cell; and
the processor is further configured to:
determine, by using the correspondence between the identities and the reference signal information, the identity corresponding to each reference signal.

6. A positioning method, comprising:
sending, by a network-side device, auxiliary data information to a terminal for enabling the terminal to perform a reference signal time difference (RSTD)

measurement on each positioning node of a same cell, and the auxiliary data information comprises an identity of the each positioning node of the same cell, the identity is configured to distinguish different positioning nodes belonging to the same cell;

receiving, by the network-side device, an RSTD measurement result sent by the terminal; and determining, by the network-side device, a location of the terminal by a predetermined algorithm and the received RSTD measurement result.

7. The positioning method according to claim 6, wherein the auxiliary data information further comprises:

reference signal information of the each positioning node of the same cell and a correspondence between the identity of the each positioning node of the same cell and the reference signal information, wherein the reference signal information of the each positioning node of the same cell comprises at least one of:

reference signal sending bandwidth;
reference signal sending time;
reference signal subframe quantity;
reference signal frequency information; or
reference signal muting information.

8. A positioning method, comprising:

receiving, by a terminal, auxiliary data information sent by a network-side device, wherein the auxiliary data information comprises an identity of each positioning node of a same cell, the identity is configured to distinguish different positioning nodes belonging the a same cell;

performing, by the terminal by using the auxiliary data information, a reference signal time difference (RSTD) measurement on reference signals sent by the each positioning node of the same cell, to obtain an RSTD result; and sending, by the terminal, the RSTD measurement result to the network-side device.

9. The positioning method according to claim 8, wherein the auxiliary data information further comprises:

reference signal information of the each positioning node of the same cell and a correspondence between the identity of the positioning node and the reference signal information, wherein the reference signal information of the each positioning node of the same cell comprises at least one of:

reference signal sending bandwidth;
reference signal sending time;
reference signal subframe quantity;
reference signal frequency information; or
reference signal muting information.

10. The positioning method according to claim 9, wherein before performing, by the terminal by using the auxiliary data information, the RSTD measurement on the reference signal sent by the each positioning node of the same cell, to obtain the RSTD measurement result, the method further comprises:

receiving, by the terminal by using the auxiliary data information, the reference signal sent by the each positioning node of the same cell; and determining, by the terminal by using the correspondence between the identity and the reference signal information, the identity corresponding to the reference signal.

11. A non-transitory computer-readable storage medium comprising instructions which, when executed by a computer, cause the computer to:

receive auxiliary data information sent by a network-side device, wherein the auxiliary data information comprises an identity of each positioning node of a same cell, the identity is configured to distinguish different positioning nodes belonging to the same cell;

perform, by using the auxiliary data information, a reference signal time difference (RSTD) measurement on a reference signal sent by the each positioning node of the same cell, to obtain a RSTD measurement result; and send the RSTD measurement result to the network-side device.

12. The medium according to claim 11, wherein the auxiliary data information further comprises:

reference signal information of the each positioning node of the same cell and a correspondence between the identity of the each positioning node of the same cell and the reference signal information, wherein the reference signal information of the each positioning node of the same cell comprises at least one of:

reference signal sending bandwidth;
reference signal sending time;
reference signal subframe quantity;
reference signal frequency information; or
reference signal muting information.

13. The positioning apparatus according to claim 1, wherein the identity is located in a predetermined field in the auxiliary data information, the predetermined field comprising any one of the following: a cell global identity (CGI) field, an enhanced cell global identity (eCGI) field, and an index number field.

14. The positioning apparatus according to claim 3, wherein the identity is located in a predetermined field in the auxiliary data information, the predetermined field comprising any one of the following: a cell global identity (CGI) field, an enhanced cell global identity (eCGI) field, and an index number field.

15. The positioning method according to claim 6, wherein the identity is located in a predetermined field in the auxiliary data information, the predetermined field comprising any one of the following: a cell global identity (CGI) field, an enhanced cell global identity (eCGI) field, and an index number field.

16. The positioning method according to claim 8, wherein the identity is located in a predetermined field in the auxiliary data information, the predetermined field comprising any one of the following: a cell global identity (CGI) field, an enhanced cell global identity (eCGI) field, and an index number field.

* * * * *